Oct. 9, 1962 D. A. DUTTON 3,058,011
GENERATOR OF RANDOM DOUBLE PULSE PAIRS
Filed Oct. 13, 1960 2 Sheets-Sheet 1

INVENTOR.
DONALD A. DUTTON
BY
*T. L. Styner*
ATTORNEY

Oct. 9, 1962 D. A. DUTTON 3,058,011
GENERATOR OF RANDOM DOUBLE PULSE PAIRS
Filed Oct. 13, 1960 2 Sheets-Sheet 2

United States Patent Office 3,058,011
Patented Oct. 9, 1962

3,058,011
GENERATOR OF RANDOM DOUBLE PULSE PAIRS
Donald A. Dutton, Rochester, N.Y., assignor to General Dynamics Corporation, Rochester, N.Y., a corporation of Delaware
Filed Oct. 13, 1960, Ser. No. 62,216
8 Claims. (Cl. 307—88.5)

This invention relates to distance measuring radio circuits and is particularly directed to means for establishing the radio link between an interrogating mobile station and its reference ground station. This invention more specifically is directed to means for modulating the radio frequency carrier of the mobile transmitter with randomly occurring pairs of strong pulses.

In radar-type navigating equipment, or in so-called tactical air navigating systems commonly known as TACAN, the transit or travel time of a radio wave between two points is translated into distance. In radar, a powerful pulse of microwave energy is transmitted to a prominent reflecting object, the echo pulse is received back at the starting point, and the elapsed time between the instant of transmission and reception is a measure of distance. For all practical purposes, the velocity of radio waves in the air is the same as the velocity of light waves, and is constant.

In TACAN systems, which will be hereinafter referred to in detail, an interrogating pulse or series of pulses is radiated omnidirectionally, usually from an airborne platform and is received at a fixed station called the "beacon" from which is retransmitted a reply pulse or series of pulses. When received at the initiating point, the transit time my be computed by stroboscopic techniques as in the case of conventional pulse radar. It has been found desirable to transmit two closely and precisely spaced pulses for each "pulse" to be radiated to the beacon for the purpose of minimizing the probability of static or other noise pulses being falsely interpreted as an interrogating pulse. Further, since a large number of airborne TACAN equipments may simultaneously interrogate the same beacon, it has been found desirable to distinguish the series of double-pulse signals of one airborne transmitter from all other airborne transmitters by permitting the spacings between the pulse pairs to wander at random. Then only will the receiver of a particular airborne equipment be able to decode the random series initiated by its own adjacent transmitter. Another requirement of the airborne equipment of the TACAN type is that the average operating pulse rate have two values—one relatively high while the airborne unit is "searching" for a beacon and one relatively low while the airborne unit is "locked on" and is "tracking" an engaged beacon. These pulse rates for TACAN airborne equipments known as the AN/ARN–21 are about 150 p.p.s. and 24 p.p.s., respectively.

The principal object of this invention is to generate pairs of powerful pulses precisely spaced, the spacing between pairs nevertheless varying at random, and the average pulse rate having two selectable values for "search" and "track," respectively.

For time and distance measuring purposes, it will be perceived that the interrogating pulse pairs must be quite powerful although the duty cycle may be quite low, and that the modulating circuits of the radio transmitter must be Gaussian in nature and free of a spurious harmonic frequency content. That is, ideally, the interrogating pulses are but one or two microseconds in duration, are generated in pairs, and the pulses of each pair are precisely spaced, yet the pulse pair rates very randomly and do not induce transients in either the transmitting or receiving circuits. Attempts heretofore to attain all of these ideal characteristics in AN/ARN–21 type equipments has left much to be desired, the equipment being large complex and heavy and having high voltage tube circuits which fail at high altitudes and which do not reliably produce clean-cut distinct pulses.

Accordingly, a further object of this invention is to provide an improved lightweight, simple pulse pair source and modulating circuit for reliably radiating clean-cut distinct pulse pairs randomly spaced.

Other objects and features of this invention will become apparent to those skilled in the art by referring to the specific embodiment described in the following specification and illustrated in the accompanying drawings in which.

Figure 1:
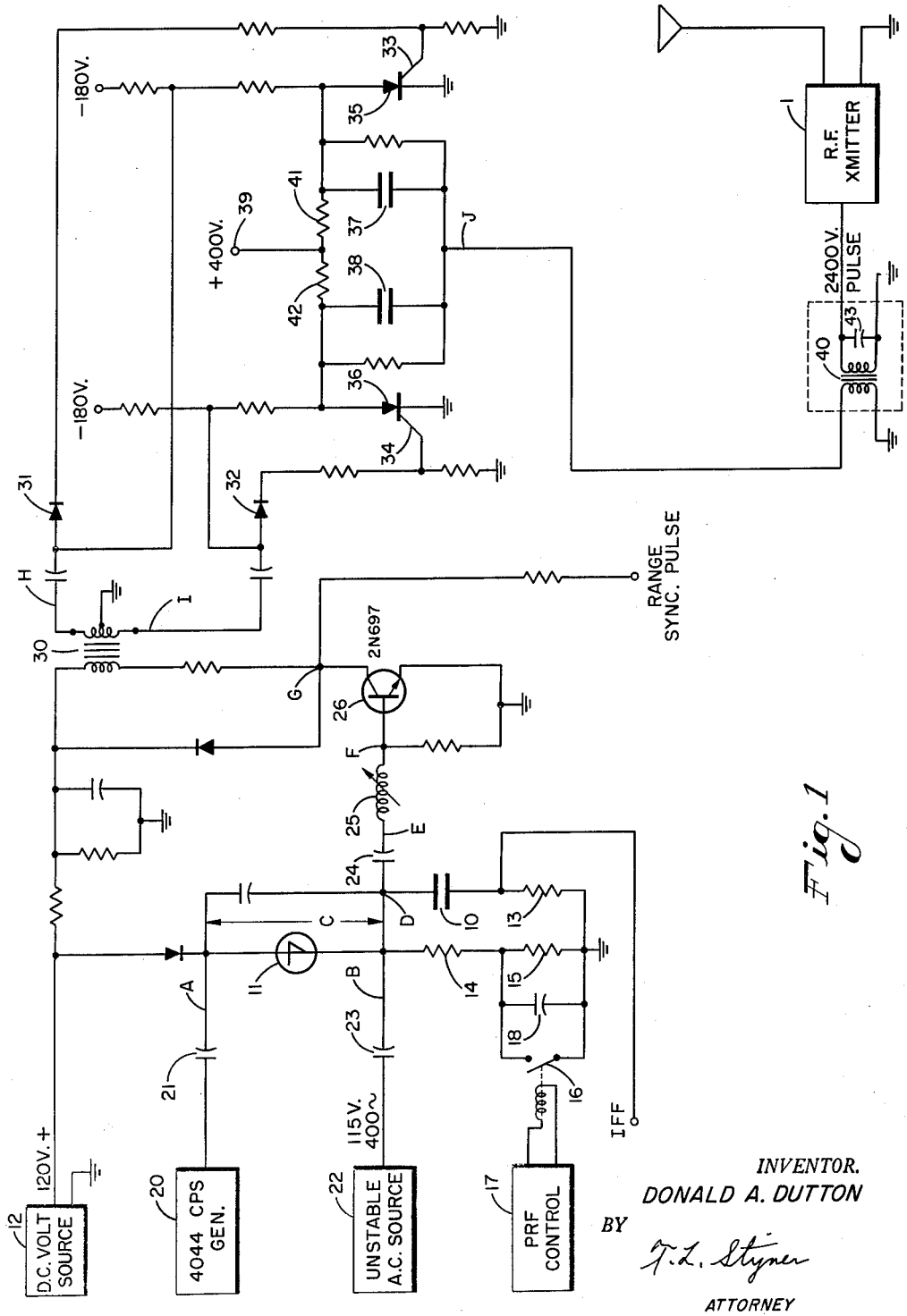
FIG. 1 is a circuit diagram of said preferred embodiment.

The circuitry shown in FIG. 1 and connected to the transmitter 1 is for the purpose of generating powerful pulse pairs randomly spaced for driving the transmitter. The microwave energy radiated by the transmitter is normally zero except only when stimulated by the pulse pairs generated in the circuits of FIG. 1. The pulse pairs applied preferably to the control grids of the RF amplifier tubes, not shown, of the transmitter 1 are of the type shown on line J in FIG. 2. Ideally, the pulse pairs there shown are precisely spaced, for example 12 microseconds apart, and yet the spacings between the pulse pairs vary randomly, or "jitter" about a predetermined average. Each pulse is sharply defined and although of only 1 or 2 microseconds' duration preferably contains considerable power.

Figure 2:
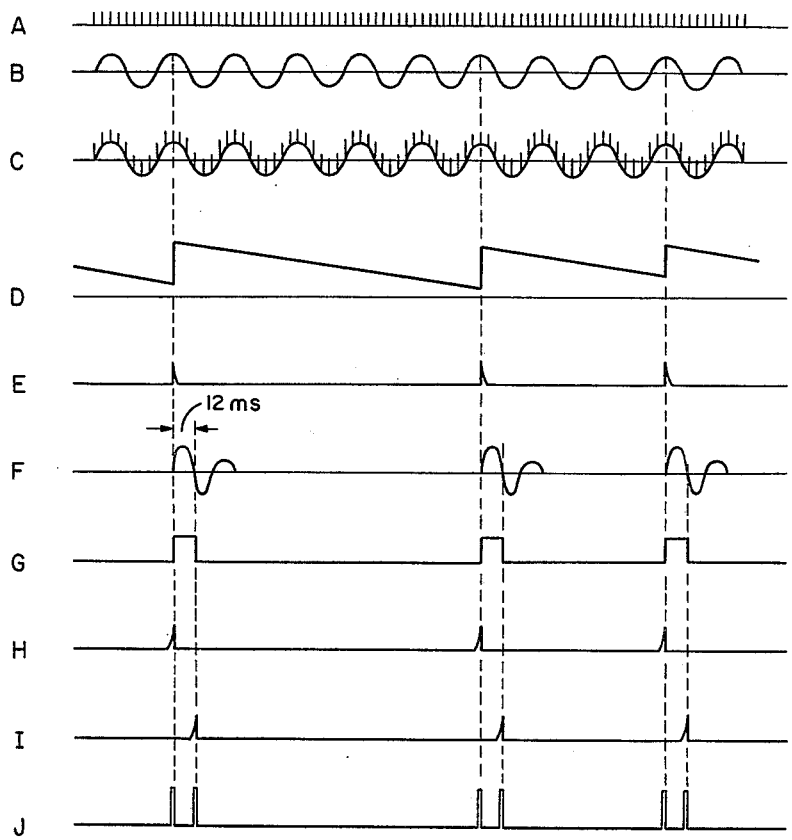
FIG. 2 shows diagrams of voltages, on similar time basis, at different points throughout the circuit of FIG. 1.
Figure 3:
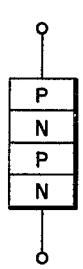
FIG. 3 shows diagrammatically a four-layer diode which has the negative resistance characteristics employed importantly in the circuit of FIG. 1.
Figure 4:
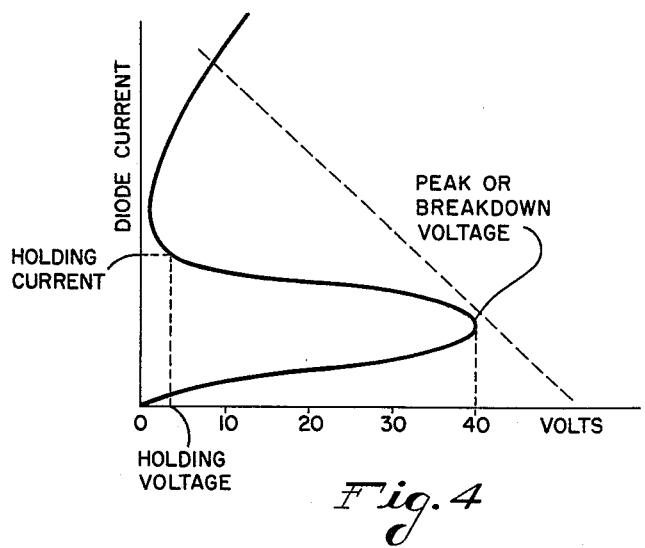
FIG. 4 is a voltage-current characteristic of the four-layer diode of FIG. 3.

According to an important feature of this invention, a saw-tooth wave of the type shown on line D, in FIG. 2, is generated by the novel connections to storage condenser 10, in FIG. 1. The storage condenser 10 is rapidly charged through the negative resistance device 11 from a high voltage source connected to terminal 12. While the desired negative resistance of device 11 may be obtained by gas-tube devices, the "avalanche" effect of solid-state switches are preferred. For example, the so-called four-layer diode consisting, as shown in FIG. 3, of alternate layers of P-type and N-type germanium or silicon is well suited because of weight and electrical characteristics to the purposes of this invention. The four-layer, two-terminal diode of the type commercially known in the United States as the 4D30–30 has space charge regions at the interfaces of the layers and has relatively high resistance throughout a finite voltage range. When this voltage range across the diode is exceeded, an avalanche of electrons is started and the apparent resistance of the diode drops almost to zero. Such a characteristic is shown in FIG. 4 where the peak or breakdown voltage of the 4D30–30 diode occurs at about 40 volts. This voltage can be expected to vary some among diodes of different manufacturers. Such a characteristic adapts this ideally to the switching operations desired here. When the avalanche occurs, the capacitor 10 is charged rapidly by the 120 volt supply shown through the diode 11 and the current-limiting resistor 13. As the condenser 10 approaches full charge, the current through the diode 11 drops to a value less than its holding current and diode 11 switches off or becomes essentially an open circuit. Capacitor 10 then discharges comparatively slowly through resistors 14 and 15 until the voltage across diode 11 again reaches its firing voltage, at which time diode 11 again becomes conductive and again rapidly recharges condenser 10.

According to an important feature of this invention, the CR time constant circuit of condenser 10 may be changed by shorting out part or all of resistor 15 with switch 16. When switch 16 is opened, the time constant of condenser 10 is abruptly lengthened. In one TACAN system, the pulse repetition rate of the saw-tooth generator, with switch 16 closed, was established at about 150 pulses per second during the "search" phase of the TACAN equipment. Then, when the switch 16 was opened, the PRF was reduced to about 24 pulses per second for the "track" phases of operation of the equipment. Conveniently, the switch 16 is electromechanically operated by the pulse-repetition-frequency control circuits indicated by the numeral 17 which operates in response to the receipt of reply pulses received from the ground beacon by the associated airborne receiver, not shown. According to another feature of this invention, the condenser 18 is connected across the contacts of switch 16 to prevent sudden changes from the search to the track modes to permit ample settling time for the mechanically driven indicating portions of equipment, not shown, and to prevent overshoot and loss of a signal received during search.

It will thus be seen that the voltage at point D in FIG. 1 is saw-tooth in form, the saw-tooth waveform being shown on line D in FIG. 2. It will be perceived now that the period of the saw-tooth wave is determined not only by the rate of decay or the slope of the ramp fixed by the values of resistances 14 and 15 and condenser 10 but by the supply voltage 12, by the inherent firing voltage of the diode 11, and by any modulating voltages applied directly across the negative resistance device 11. According to an important feature of this invention, the voltages directly across diode 11 are modulated by the two sources 20 and 22. Source 20 connected to one terminal of the diode 11 comprises a pulse generator adapted preferably to generate 4044 narrow pulses per second. This particular frequency has been chosen because the wavelength of 4044 c.p.s. is a convenient multiple of twenty miles in the distance measuring circuits of the equipment with which this invention is used. The output of generator 20 is applied through coupling condenser 21, in the particular example illustrated, to the "anode" end of diode 11. The second modulating voltage, preferably applied to the other terminal of diode 11, is obtained from the alternating current source 22. The rotary generator of an airplane, for example, produces about 400 c.p.s. during flight which is a wave more or less sinusoidal, which is not particularly stable and which is ideally suited to the purposes of this invention. As shown, the A.C. source 22 is coupled through coupling condenser 23 to the "cathode" end of the diode 11. It follows that the instantaneous sum of the two voltages from sources 20 and 22 are added to the direct current voltage of source 12 as well as to the instantaneous saw-tooth voltage of storage condenser 10. The instantaneous algebraic sum of all these voltages determines the instant of breakdown of the negative resistance device 11, and, as will be apparent, the instant of breakdown will not occur at regular intervals but will jitter randomly.

Referring to FIG. 2, the pulses of the 4044 c.p.s. series on line A are added to the alternating voltage on line B; and when the sum of these two voltages across the diode, when added to the gradually decaying voltage ramp of condenser 10, exceeds the breakdown voltage, the diode fires producing a sudden potential rise across the condenser 10 as indicated on line D of FIG. 2. It is important to note that since the firing potential of device 11 is dependent on the sum of three independent unregulated voltages, the precise pulse of the 4044 series which will fire the diode varies widely and randomly, and yet the diode firing is always at the instant of one of the relative sharp pulses of source 20 and hence the firing is always some submultiple of the 4044 frequency. It has been found, as stated, the repetition frequency of the saw-tooth wave "jitters" continuously about the frequency fixed by the time constant of condenser 10 and its shunt resistance.

The saw-tooth wave appearing at point D is coupled through the series resonant circuit, including coupling condenser 24 and inductance 25, to the base of transistor amplifier 26. The steep fronts of the saw-tooth wave at point D are differentiated by condenser 24 to produce voltage spikes E. See line E in FIG. 2. Spikes E in turn cause damped oscillations in the series resonant circuit. See line F in FIG. 2. Transistor 26, in the example shown, is of the comercially available 2N697-type and the parameters of the circuits connected thereto are so chosen as to cause the transistor to be overdriven by at least the first excursion of the damped oscillations so that the sinusoidal wave of the damped oscillations appearing at the base becomes, essentially, a square wave in the collector circuit of the transistor. See line G in FIG. 2. The inductance 25 is preferably variable and is adjusted so that one-half period of the ringing circuit is equal to the desired spacing between the pulse pairs to be transmitted. A half period of 12 microseconds is chosen in the example here considered.

Next, the square wave is applied to the primary winding of transformer 30 and the steep sides of the square wave are differentiated in the primary winding of transformer 30, resulting in two narrow pulses spaced precisely 12 microseconds apart, but of opposite polarity. By center tapping and grounding the secondary winding of transformer 30, the two pulses appear, respectively, at the two terminals, H and I, of the secondary winding as two timed spaced positive trigger pulses, as shown on lines H and I of FIG. 2.

Means for converting these two trigger pulses, H and I, of relatively low power and with precise spacing and random occurrence at the opposite terminals of the secondary winding of transformer 30, to series pulses of relatively high power in a single circuit without distortion or spurious side effects will now be described. The two trigger pulses H and I are coupled, respectively, through coupling condensers and diodes 31 and 32 to the control electrodes 33 and 34 of controlled switch means 35 and 36. The relatively large storage condensers 37 and 38 are charged by a direct current source connected between terminal 39 and ground, through the primary winding of modulation transformer 40. The controlled switch means 35 and 36 are used in conjunction with storage capacitors 37 and 38 to provide high current pulses for the modulation transformer 40. In the example considered here, capacitors 37 and 38 are fully but gradually charged by the +400 volt source through charging resistors 41 and 42. Switch means 35 and 36 may comprise any fast acting device, such as grid controlled thyratrons or silicon controlled rectifiers, so that when the trigger pulses H and I are applied to the control electrodes of the devices 35 and 36 the impedances of the devices suddenly drop to near zero and the capacitors are very rapidly discharged. The discharge paths include ground and the primary winding of transformer 40, as shown. Since the trigger pulses are precise time intervals apart, the two spaced high current pulses formed at the secondary terminals of the transformer 40 are correspondingly spaced. These high current pulses may be stepped up in the transformer sufficient to produce the high voltage pulses required to drive the particular RF amplifiers employed in the transmitter 1. The particular RF stage driven by one modulator of this invention was a magnetron.

According to a still further and important feature of this invention, the silicon controlled rectifiers 35 and 36 are turned off by the negative backswing of the transformer, thus preventing transient effects after each powerful pulse. The storage capacitors 37 and 38 are thus permitted to immediately recharge and the accuracy of the spacing of the pulse pairs established by damped ringing circuit 24—25 is preserved. The iron of the core of transformer 40 is ample, preferably, so that in conjunction with the tuning condenser 43 the pulses available at the secondary basically Gaussian shaped to provide a minimized spectrum for the transmitter.

Hence, this invention comprises a system for generating pairs of powerful pulses for transmission, the spacings between the pulses of each pair being precisely predetermined and the spacings between the pairs of pulses being completely random. The circuitry for performing these stringent specifications are relatively simple, light in weight and particularly adapted for airborn TACAN equipment of the type known as the AN/ARN–21. For example, a solid-state modulator has been constructed weighing only twenty-five ounces and adapted to modulate an eight kilowatt carrier with Gaussian shaped pairs of pulses, the pairs of pulses jittering about preset means repetition rates during searching and tracking modes of operation.

Many changes can be made in the specific circuitry illustrated in FIG. 1 without departing from the scope of the appended claims.

What is claimed is:

1. The combination in a navigating system for producing randomly spaced pairs of pulses comprising a source of pulses of random spacing, a damped ringing circuit connected to said source, said ringing circuit being adjusted to have a half-period equal to the desired spacing of the pulses of said pairs of pulses, an amplifier, said amplifier being overdriven by the first half-wave of said ringing circuit to produce a substantially square wave with steep forward and rearward edges, differentiating means coupled to said overdriven amplifier for producing distinct trigger pulses, respectively, at the instant of and in response to said forward and rearward edges of said square wave, two storage condensers, means for charging said storage condensers, means for discharging said storage condensers through an output circuit, switch means with control means coupled respectively between said storage condensers and said output circuit, and coupling means for applying said distinct trigger pulses respectively to the control means of said switch means.

2. In combination, a solid-state modulator, a transmitter coupled to said modulator, said modulator comprising a saw-tooth generator including a storage condenser, a negative resistance device, and a voltage source connected in series so that said condenser rapidly charges from said source when the voltage across said negative resistance device attains a predetermined breakdown voltage, a ringing circuit coupled to said saw-tooth generator for producing a damped sinusoidal half-wave in response to sudden storage condenser charging, an amplifier coupled to said ringing circuit for generating a square wave with steep wave fronts corresponding to said half-wave, differentiating means coupled to said amplifier for generating voltage spikes at said steep wave fronts; storage condensers connected in parallel to the modulating circuit in said transmitter, switch means respectively in circuit with each storage condenser, and means responsive to said voltage spikes for controlling said switch means for successively discharging said condensers into the modulating circuit of said transmitter.

3. The solid-state modulator defined in claim 2 including said saw-tooth generator with series negative resistance device, storage condenser and voltage source, further comprising means for modulating the voltage across said negative resistance device, said means comprising a pulse generator, said pulse generator being coupled to one terminal of said negative resistance device, an alternating current source, said alternating current source being coupled to the other terminal of said negative resistance device so that said negative resistance device will fire randomly each time the sum of the voltage of said pulses, the voltage of the alternating wave and the voltage of said storage condenser exceeds the breakdown voltage of said negative resistance device.

4. The solid-state modulator defined in claim 3, said storage device having a discharge circuit including a resistance of predetermined value in shunt with said condenser, and means for shunting out a portion of said resistance to change the frequency of the saw-tooth wave generated by said generator.

5. The solid-state modulator as defined in claim 4 further comprising a condenser coupled across the shunted portion of said resistance to slow the change of saw-tooth frequency when said switch is opened.

6. In combination in a modulator, a source of saw-tooth waves, said waves each having a steep wave front, means connected to said source to cause said steep wave fronts to reoccur randomly, a series L–C ringing circuit coupled to said source for generating a damped substantially sinusoidal wave of predetermined period in response to the stimulus of said steep wave fronts, means for converting said sinusoidal wave to a substantially square wave of equal period, and means for differentiating the steep side of said square wave to produce two pulses spaced apart by a time interval determined by said L–C ringing circuit, and means for utilizing said pulses.

7. In combination in a solid-state modulator for a radio navigating system where pulses are generated at random multiples of a predetermined interval, a saw-tooth generator comprising a storage condenser with a fast charging circuit including a direct current source and a negative resistance device, said negative resistance device having a normal relatively high resistance which changes to a relatively low resistance when triggered by a predetermined voltage across the resistance device, said negative resistance device and said direct current source being connected in series across said condenser, a relatively slow discharging circuit including a resistance connected across said condenser, an alternating voltage source of relatively low unstable frequency and of unstable amplitude, and a pulse source of relatively high repetition frequency, the pulses having said predetermined interval, said alternating and pulse voltage sources being coupled to said negative resistance device to additively combine, across said negative resistance device, the pulse voltages, the alternating voltages and the decaying condenser voltages to randomly trigger the condenser charging action.

8. In combination in a solid-state modulator for a radio navigating system where pulses are generated at random multiples of a predetermined interval, a saw-tooth generator comprising a storage condenser, a fast charging circuit including a direct current source and a negative resistance device, said negative resistance device having a normal relatively high resistance and a relatively low resistance when triggered by a predetermined voltage, said negative resistance device and said direct current source being connected in series across said condenser, a relatively slow discharging circuit including a resistance connected across said condenser, an alternating voltage source, a stable pulse source with a repetition rate relatively high with respect to the frequency of said alternating source, the pulse intervals corresponding to said predetermined interval, said sources being coupled to the terminals of said negative resistance device, the polarity and voltage of said pulse source being selected so that when combined with the voltages of said alternating source, of said condenser, and of said direct current source the pulse voltages randomly trigger said negative resistance device, and means responsive to the fast-charging current through said negative resistance device for producing said random pulses.

References Cited in the file of this patent

UNITED STATES PATENTS

| | | |
|---|---|---|
| 2,430,154 | Woodward | Nov. 4, 1947 |
| 2,434,920 | Grieg | Jan. 27, 1948 |
| 2,789,225 | Fleming | Apr. 16, 1957 |
| 2,874,315 | Reichert | Feb. 17, 1959 |
| 2,975,377 | Price et al. | Mar. 14, 1961 |